United States Patent
Chandrasekhar (10) Patent No.: US 11,965,614 B2
(45) Date of Patent: Apr. 23, 2024

(54) CABLE MANAGEMENT APPARATUS

(71) Applicant: Eshwar Chandrasekhar, San Ramon, CA (US)

(72) Inventor: Eshwar Chandrasekhar, San Ramon, CA (US)

( * ) Notice: Subject to any disclaimer, the term of this patent is extended or adjusted under 35 U.S.C. 154(b) by 399 days.

(21) Appl. No.: 17/443,184

(22) Filed: Jul. 22, 2021

(65) Prior Publication Data

US 2023/0026660 A1    Jan. 26, 2023

(51) Int. Cl.
*F16L 9/17* (2006.01)
*F16L 3/12* (2006.01)
*F16L 3/137* (2006.01)

(52) U.S. Cl.
CPC ............. *F16L 3/137* (2013.01); *F16L 3/1226* (2013.01); *F16L 9/17* (2013.01)

(58) Field of Classification Search
CPC ............ F16L 11/08; F16L 3/26; Y10S 138/08
USPC ........ 138/118, 138, 156, 166–169, 172, 177, 138/DIG. 8; 174/72 A, DIG. 11
See application file for complete search history.

(56) References Cited

U.S. PATENT DOCUMENTS

| | | | | |
|---|---|---|---|---|
| 2,704,556 A | * | 3/1955 | Blish | F16L 11/121 137/155 |
| 2,937,664 A | * | 5/1960 | Plummer | F16L 9/17 174/DIG. 11 |
| 2,998,028 A | * | 8/1961 | Rohde | F16L 11/08 138/109 |
| 4,463,779 A | * | 8/1984 | Wink | F16L 11/121 138/133 |
| 4,669,508 A | * | 6/1987 | Neaves | B29D 23/006 138/121 |
| 5,894,866 A | * | 4/1999 | Horst | F16L 3/003 138/172 |

(Continued)

OTHER PUBLICATIONS

BT.com. StarTech.com Flexible Wire Cable Raceway Duct., retrieved from the internet Feb. 1, 2021, <https://www.businessdirect.bt.com/products/startech-com-flexible-wire-cable-raceway-duct-cbmfwd2030-FXZS.html#>.

(Continued)

*Primary Examiner* — Patrick F Brinson
(74) *Attorney, Agent, or Firm* — Thompson Patent Law Offices PC (57) ABSTRACT

Apparatus and associated methods relate to a shapeable conduit. In an illustrative example, the shapeable conduit may have a circumferentially flexible wall extending along a longitudinal axis. The wall may, for example, define a lumen configured to receive one or more cables. Multiple longitudinally extendable manually deformable axial stiffening members may, for example, be circumferentially distributed in the wall. A releasable coupling mechanism may, for example, have at least two mating engagement members. The engagement members may, for example, releasably engage in an enclosed state such that the wall circumscribes the lumen. The engagement members may, for example, be tangentially separable into an open state such that the cables can be radially transferred between an interior and an exterior of the lumen. Various embodiments may advantageously be manipulated such that the axial stiffening members cause the flexible wall to retain cables enclosed within the lumen in a desired configuration.

19 Claims, 7 Drawing Sheets

(56) References Cited

U.S. PATENT DOCUMENTS

| | | | |
|---|---|---|---|
| 6,105,620 A * | 8/2000 | Haberl | F16L 11/20 |
| | | | 138/148 |
| 6,679,298 B2 | 1/2004 | Espinasse | |
| 7,119,279 B2 * | 10/2006 | Niehaus | H02G 3/0487 |
| | | | 174/DIG. 11 |
| 8,206,343 B2 | 6/2012 | Racz | |
| 8,356,636 B2 | 1/2013 | Witz et al. | |
| 2004/0261880 A1 * | 12/2004 | Kleinsasser | B29C 66/4722 |
| | | | 138/167 |
| 2006/0074402 A1 | 4/2006 | Lawrece et al. | |
| 2014/0194857 A1 | 7/2014 | Eilat | |

OTHER PUBLICATIONS

CTAM Inc. WireTrak Cable Raceway On a Roll, retrieved from the internet Feb. 1, 2021, <https://www.cabletiesandmore.com/wire-trak-raceway-on-roll>.

CTAM Inc., Techflex® Flexo® Wrap Braided Cable Sleeving, retrieved from the internet Feb. 1, 2021, <https://www.cabletiesandmore.com/flexo-wrap-braided-sleeving>.

EVEO. EVEO Cable Management Sleeves and Cable Concealer—4 Cord Sleeve Cord Organizer Cable Organizer Wire Organizer—Cable Sleeve, Black Cord Management and Cable Sleeves Cords for Wire Management, retrieved from the internet Feb. 1, 2021, <https://www.amazon.com/EVEO-Cable-Management-Sleeve-Organizers/dp/B07Y23TMZ4/ref=zg_bs_6577542011_4>.

McMaster-Carr. Heat-Reflective Wrap-Around Sleeving, retrieved from the internet Feb. 1, 2021, <https://www.mcmaster.com/>.

McMaster-Carr. Snap-Close Wrap-Around Sleeving, retrieved from the internet Feb. 1, 2021, <https://www.mcmaster.com/>.

MEGAQ. Cable Management Sleeves,MEGAQ Cable Tidy Cuttable Nylon Cord Management Organizer System, 3000mm130mm,DIY by Yourself, Adjustable Reversible Wires Sleeve, Black, retrieved from the internet Feb. 1, 2021, <https://www.amazon.com/Management-MEGAQ-3000mm130mm-Adjustable-Reversible/dp/B085NN269F/ref=asc_df_B085NN269F/>.

Printasleeve Ltd. Buy Pre-printed sleeves and markers Sleeving Online, retrieved from the internet Feb. 1, 2021, <https://printasleeve.com/product/pre-printed-sleeves-and-markers/>.

ProMaster. New Design PREMIUM 63" Cable Management Sleeve, Best Cords Organizer System for TV Computer Office Home Entertainment, DIY Adjustable Black-White Cord Sleeves Wire Cover Concealer Wrap, retrieved from the internet, <https://www.amazon.com/Management-Organizer-Entertainment-ProMaster-Adjustable/dp/B01DDIMMLA/ref=zg_bs_6577542011_8>.

Williamson, J. Case Smithing: Getting Started with DIY Cable Sleeving, Jan. 29, 201, retrieved from the internet Feb. 1, 2021, <https://www.tweaktown.com/guides/5175/case-smithing-getting-started-with-diy-cable-sleeving/index.html>.

* cited by examiner

CABLE MANAGEMENT APPARATUS

TECHNICAL FIELD

Various embodiments relate generally to cable management.

BACKGROUND

Conduits may couple sources and receivers. Cables may, for example, provide conduits for power (e.g., electrical power), data, or some combination thereof. Power cables may provide a conduit between a power source and a power consumer. Data cables may provide a conduit (e.g., electrical) between information source(s) and information receiver(s).

Fluid conduits may, for example, connect a fluid source and fluid receptacle. Fluid conduits may, for example, be configured to conduct liquids (e.g., water, petroleum-based products) and/or gases (e.g., air). Fluid conduits may conduct fluid at ambient pressures, at elevated pressures, and/or under a vacuum.

SUMMARY

Apparatus and associated methods relate to a shapeable conduit. In an illustrative example, the shapeable conduit may have a circumferentially flexible wall extendable along a longitudinal axis. The wall may, for example, define a lumen configured to receive one or more cables. Multiple longitudinally extendable manually deformable axial stiffening members may, for example, be circumferentially distributed in the wall. A releasable coupling mechanism may, for example, have at least two mating engagement members. The engagement members may, for example, releasably engage in an enclosed state such that the wall circumscribes the lumen. The engagement members may, for example, be tangentially separable into an open state such that the cables can be radially transferred between an interior and an exterior of the lumen. Various embodiments may advantageously be manipulated such that the axial stiffening members cause the flexible wall to retain cables enclosed within the lumen in a desired configuration.

Various embodiments may achieve one or more advantages. For example, some embodiments may advantageously organize cables in a user-determined configuration. Various embodiments may, for example, allow an effective length of a conduit (e.g., cable, tubing) to be advantageously set by a user by stowing excess length in a shapeable conduit. Some embodiments may provide modular longitudinal and/or circumferential expansion. In various embodiments, a user configuration of cables in a shapeable conduit and/or of a shapeable conduit 505 in a (work) area (e.g., on a desk, behind a cabinet) may be advantageously maintained. Various embodiments may, for example, prevent slippage of the shapeable conduit along cables disposed within the shapeable conduit. In some embodiments may, a shapeable conduit and/or jacket for the shapeable conduit may be advantageously (visually) customized.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a shapeable conduit system is introduced with reference to FIGS. 1-2. Second, that introduction leads into a description with reference to FIGS. 3-4 of some exemplary embodiments of expandable shapeable conduit systems. Third, with reference to FIGS. 5-7, exemplary components and/or accessories of a shapeable conduit system are described. Finally, the document discusses further embodiments, exemplary applications and aspects relating to shapeable conduits.

Figure 1:
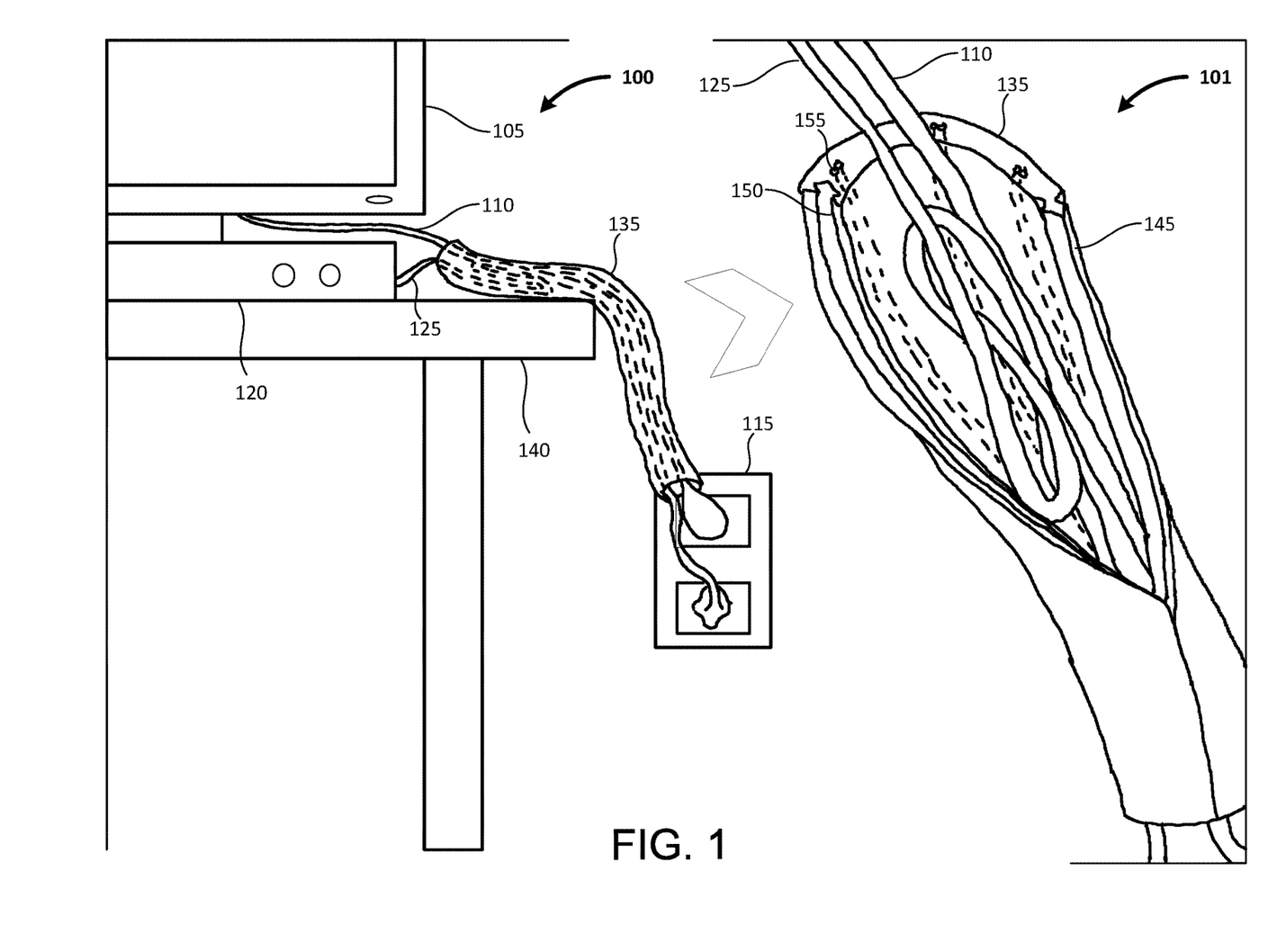
FIG. 1 depicts an exemplary shapeable conduit employed in an illustrative use-case scenario.

FIG. 1 depicts an exemplary shapeable conduit employed in an illustrative use-case scenario. In the depicted scenario 100, a display 105 is provided with a (power) conduit 110. The conduit 110 is coupled to (e.g., plugged into) a wall receptacle 115. A computer 120 is provided with a conduit 125 also coupled to the wall receptacle 115. As depicted, a portion of the length of each of the conduit 110 and conduit 125 is enclosed within a shapeable conduit 135. Accordingly, the conduit 110 and the conduit 125 may be advantageously organized on a surface of a desk 140.

In the close-up view 101, the shapeable conduit 135 is partially open at a first end, exposing the conduit 110 and the conduit 125 enclosed therein. As depicted, the conduit 125 is looped within the lumen defined by the shapeable conduit 135 such that an effective length of the conduit 125 may be advantageously set by a user using the shapeable conduit 135.

The shapeable conduit 135 may, for example, include a circumferentially flexible wall. As depicted, the circumferentially flexible wall includes a releasable coupling mechanism having two mating engagement members. A first mating engagement feature 145 includes a rib on an edge of the wall (as seen when the wall is in an open state). A second mating engagement feature 150 includes a channel formed into an opposing edge of the wall from the first mating engagement feature 145. In the depicted example, the two mating engagement members are configured to releasably engage with each other when the first mating engagement feature 145 is inserted into the second mating engagement feature 150. Accordingly, the mating engagement features are configured to releasably engage to place were shapeable conduit 135 in an enclosed state such that the wall circumscribes the lumen.

As depicted, the mating engagement features are further configured to be separated by application of tangential force urging the features apart. The tangential force may be tangential to the wall of the shapeable conduit 135. The tangential force may, for example, be applied to the wall at and/or near the first mating engagement feature 145 and/or the second mating engagement feature 150. Accordingly, the shapeable conduit 135 may be tangentially separable into an open state such that the conduit 110, the conduit 125, and/or other flexible members (e.g., power cables, data cables) can be advantageously radially transferred between an interior and an exterior of the lumen. The first mating engagement feature 145 and the second mating engagement feature 150 may, for example, be operated to engage one another (e.g., transitioning the shapeable conduit 135 into the enclosed state) by application of a tangential force urging the mating engagement features together.

The shapeable conduit 135 is further provided, in the depicted example, with three longitudinally extendable manually deformable axial stiffening members 155. The manually deformable axial stiffening members 155, as depicted, extend longitudinally along the length of the shapeable conduit 135. Each manually deformable axial stiffening member 155 may be configured such that the wall of the shapeable conduit 135 may be manipulated (e.g., bent) into a specific configuration and retain the configuration until further manipulation. The manually deformable axial stiffening members 155 may have substantially greater stiffness (e.g., a greater yield strength) then the wall.

In various embodiments manipulation may, for example, substantially alter a path of the longitudinal axis (e.g., S-shaped, doubled-back, looped, kinked, rolled) without substantial (maintained effects) on a cross-sectional shape of the wall. For example, a user may advantageously manipulate the manually deformable axial stiffening members 155 such that a longitudinal axis of the shapeable conduit 135 follows a desired path. In response to manipulation of the wall, the manually deformable axial stiffening members 155 may be formed to the follow the desired path. The manually deformable axial stiffening members 155 may, for example, maintain the manipulated shape such that the lumen of the shapeable conduit 135 follows the desired path. However, the circumferentially flexible wall of the shapeable conduit 135 may not retain a manipulated cross-sectional shape. Accordingly, the cross-section of the lumen may be advantageously substantially unaltered. For example, the lumen may maintain a default cross-sectional geometry, a cross-sectional geometry defined by contents of the shapeable conduit 135 (e.g., cables), or some combination thereof.

In various embodiments the stiffening members may, by way of example and not limitation, be wires. Each stiffening member may, by way of example and not limitation, include multiple manually deformable (e.g., malleable) filaments (e.g., bundled, twisted, braided). In the depicted example, the manually deformable axial stiffening members 155 are each made of two filaments (e.g., longitudinally joined and/or twisted wires). In some embodiments a stiffening member may, by way of example and not limitation, be constructed of steel and/or other manually deformable (e.g., malleable) metal.

As depicted, the manually deformable axial stiffening members 155 are circumferentially distributed in the wall. In various embodiments the manually deformable axial stiffening members 155 may, by way of example and not limitation, be (substantially) evenly distributed in a wall of a shapeable conduit. In various embodiments the manually deformable axial stiffening members 155 may, for example, be embedded in the wall of the shapeable conduit 135. As depicted, the manually deformable axial stiffening members 155 are each entirely circumferentially enclosed (e.g., encapsulated) by the wall material. In some embodiments the manually deformable axial stiffening members 155 may be enclosed over at least one end by the wall material. In some embodiments at least some portion of the manually deformable axial stiffening members 155 may be exposed (e.g., longitudinally, at an end). In various embodiments, the manually deformable axial stiffening members 155 may be integrally formed with the wall (e.g., by over molding, by being 3D printed concurrently with, injection and/or pouring into cavities in the wall), assembled with (e.g., into) the wall, or some combination thereof.

Figure 2:
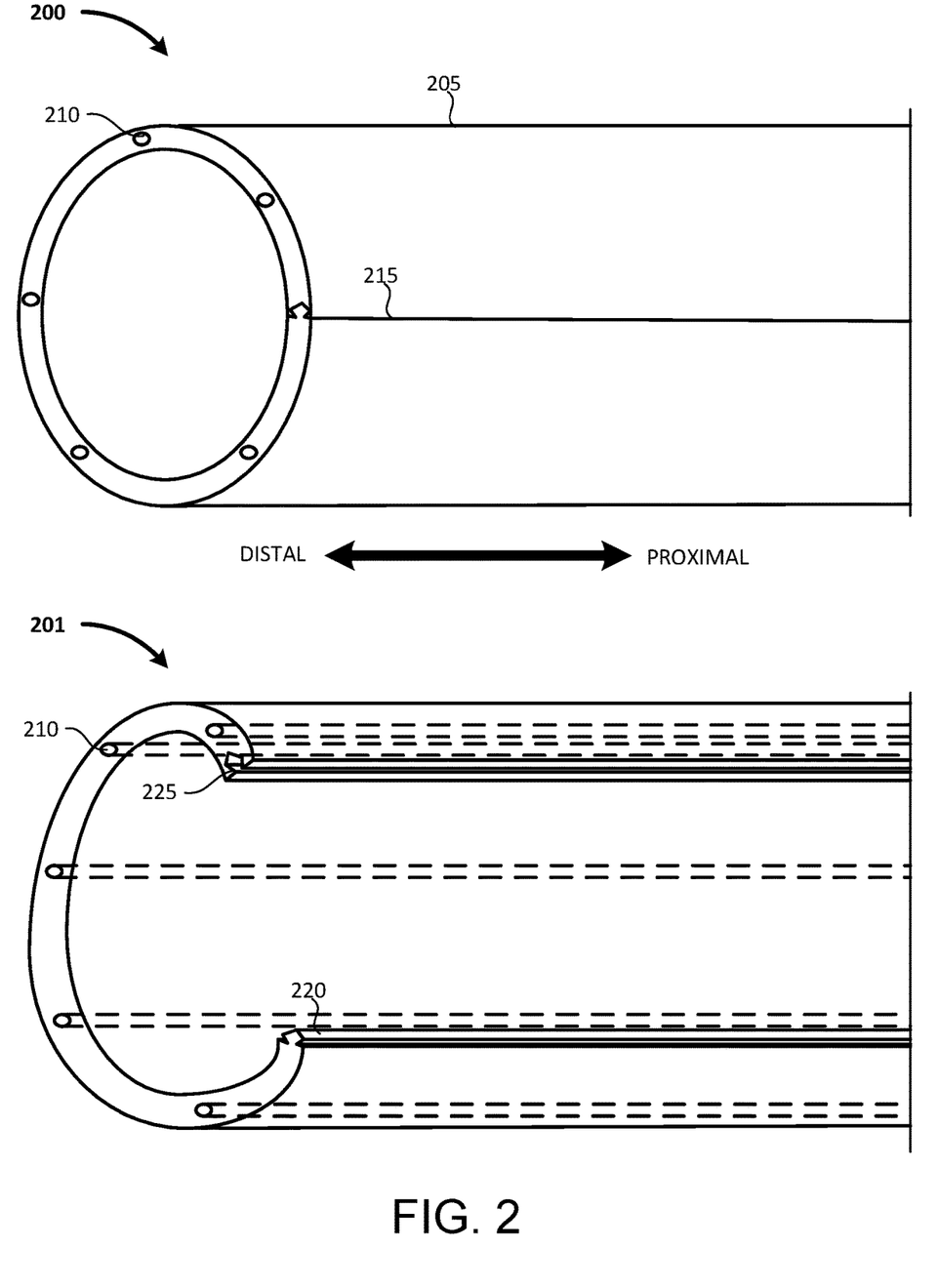
FIG. 2 depicts an exemplary shapeable conduit in an enclosed state and in an open state.

FIG. 2 depicts an exemplary shapeable conduit in an enclosed state and in an open state. A shapeable conduit 205 is shown in enclosed state 200. A longitudinal geometry of the shapeable conduit 205 is defined by five manually deformable axial stiffening members 210. The five manually deformable axial stiffening members 210 are embedded in the wall of the shapeable conduit 205. A releasably coupling mechanism 215 circumferentially couples opposing longitudinal surfaces of the wall of the shapeable conduit 205 such that the shapeable conduit 205 is retained in the enclosed state 200.

The shapeable conduit 205 is shown in an open state 201. In the open state 201, mating engagement members of the releasably coupling mechanism 215 can be seen. As depicted, the releasably coupling mechanism 215 includes a rib 220 and a channel 225. The rib 220 is shaped with lateral protrusions (forming a 'diamond' shape). The channel 225 is formed with corresponding lateral channels (forming a 'diamond' shape). Accordingly, the rib 220 may matingly engage with the channel 225 such that they are releasably coupled together. In various embodiments a channel may, for example, be patterned (e.g., with cavities and/or protrusions) in a wall of the channel. A rib may, for example, be patterned with protrusions and/or cavities. The pattern(s) of the rib and the channel may be configured, for example, to matingly engage one another when the rib is inserted into the channel.

The geometry and/or material properties of the releasably coupling mechanism 215 may, for example, be configured such that a tangential force applied to the releasably coupling mechanism 215 urging the rib 220 and the channel 225 apart must exceed a first minimum (predetermined) threshold to operate the shapeable conduit 205 from the enclosed state 200 to the open state 201. The geometry and/or material properties of the releasably coupling mechanism 215 may, for example, be configured such that a tangential force applied to the releasably coupling mechanism 215 urging the rib 220 and the channel 225 together must exceed a second minimum (predetermined) threshold to operate the shapeable conduit 205 from the open state 201 to the enclosed state 200.

In various embodiments the wall of the shapeable conduit 205 may, for example, be constructed of at least one polymeric material. The material may, for example, be at least partially elastic. Material may include, by way of example and not limitation, silicone, urethane, fabric (e.g., cotton, bamboo, nylon, polyester, elastane), or some combination thereof. In various embodiments a channel and/or a rib of a releasable coupling mechanism (e.g., releasably coupling mechanism 215) may, for example, be at least partially constructed of at least partially elastic material. The channel may, for example, be configured to expand during insertion of the rib and to contract upon full insertion of the rib such that the rib is releasably and elastically coupled within the channel. The rib may, for example, be configured to compress during insertion and to expand upon full insertion of the rib into the channel such that the rib is releasably and elastically coupled within the channel.

Figure 3:
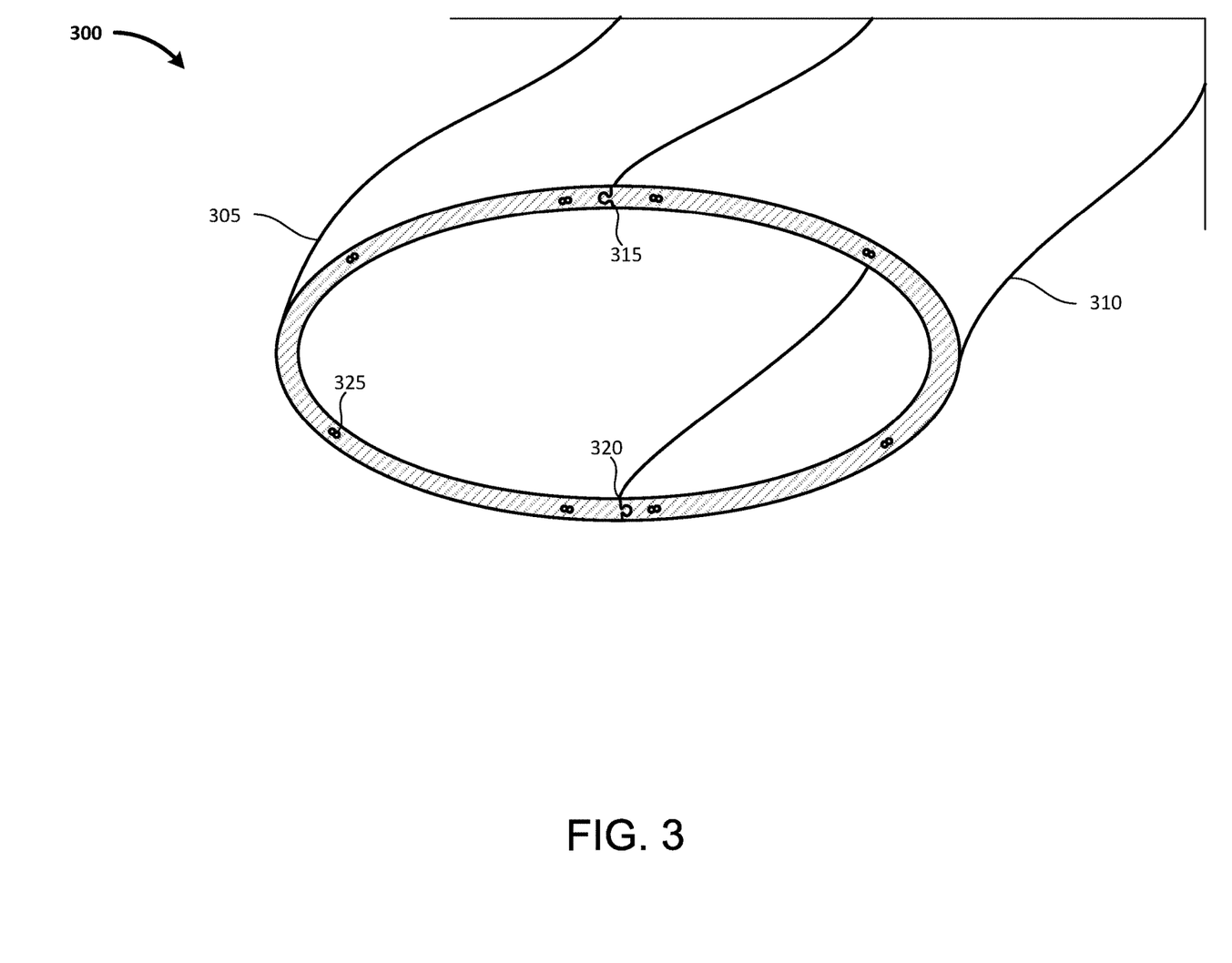
FIG. 3 depicts an exemplary circumferentially expanded shapeable conduit in an enclosed state formed from two longitudinally coupled shapeable conduits.

FIG. 3 depicts an exemplary circumferentially expanded shapeable conduit in an enclosed state formed from two longitudinally coupled shapeable conduits. A circumferentially expanded shapeable conduit 300 is module early formed from to individual shapeable conduits. A first shapeable conduit 305 and a second shapeable conduit 310 are each operated into an open state. Each of the first shapeable conduit 305 and the second shapeable conduit 310 are provided with opposing mating engagement members. A first mating engagement member of the first shapeable conduit 305 is coupled to a second mating engagement member of the second shapeable conduit 310, and a second mating engagement member of the first shapeable conduit 305 is coupled to a first mating engagement member of the second shapeable conduit 310.

Accordingly, the circumferentially expanded shapeable conduit 300 is formed, having a first releasable coupling mechanism 315 and a second releasable coupling mechanism 320. Each of the first releasable coupling mechanism 315 and the second releasable coupling mechanism 320 are formed by coupling an opposing mating engagement member of the first shapeable conduit 305 and the second shapeable conduit 310 together. The circumferentially expanded shapeable conduit 300 thereby advantageously defines a larger lumen than either the first shapeable conduit 305 or the second shapeable conduit 310.

The first shapeable conduit 305 and the second shapeable conduit 310 are each provided with manually deformable axial stiffening members 325. The manually deformable axial stiffening members 325 may advantageously be formed into a desired configuration in response to manipulation of the first shapeable conduit 305, the second shapeable conduit 310, and/or the circumferentially expanded shapeable conduit 300. The manually deformable axial stiffening members 325 may, for example, advantageously retain the circumferentially expanded shapeable conduit 300, the lumen thereof, the first shapeable conduit 305, and/or the second shapeable conduit 310 in a desired configuration.

Figure 4:
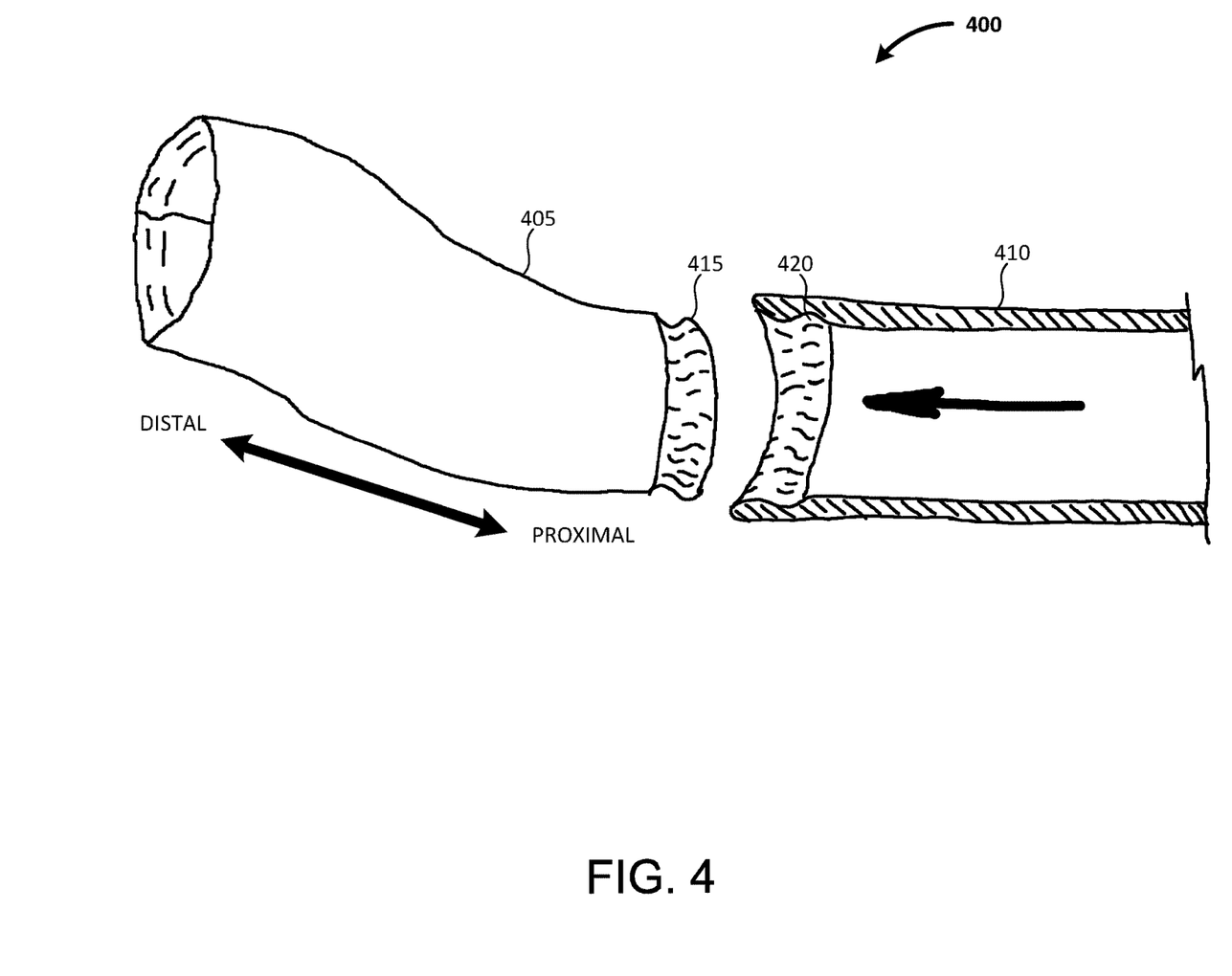
FIG. 4 depicts an exemplary longitudinally expanded shapeable conduit formed from two end-coupled shapeable conduits.

FIG. 4 depicts an exemplary longitudinally expanded shapeable conduit formed from two end-coupled shapeable conduits. A longitudinally expanded shapeable conduit 400 is formed by axially joining a first shapeable conduit 405 to a second shapeable conduit 410 (shown in cross-section along a longitudinal axis). A proximal end of the first shapeable conduit 405 is provided with a first longitudinal engagement member 415. A distal end of the second shapeable conduit 410 is provided with a second longitudinal engagement member 420.

As depicted, the first longitudinal engagement member 415 and the second longitudinal engagement member 420 or configured to matingly engage one another such that the first shapeable conduit 405 is releasably coupled to the second shapeable conduit 410. Accordingly, the longitudinally expanded shapeable conduit 400 is formed, defining a lumen having a length longer than a length of either the first shapeable conduit 405 or the second shapeable conduit 410 individually.

Figure 5:
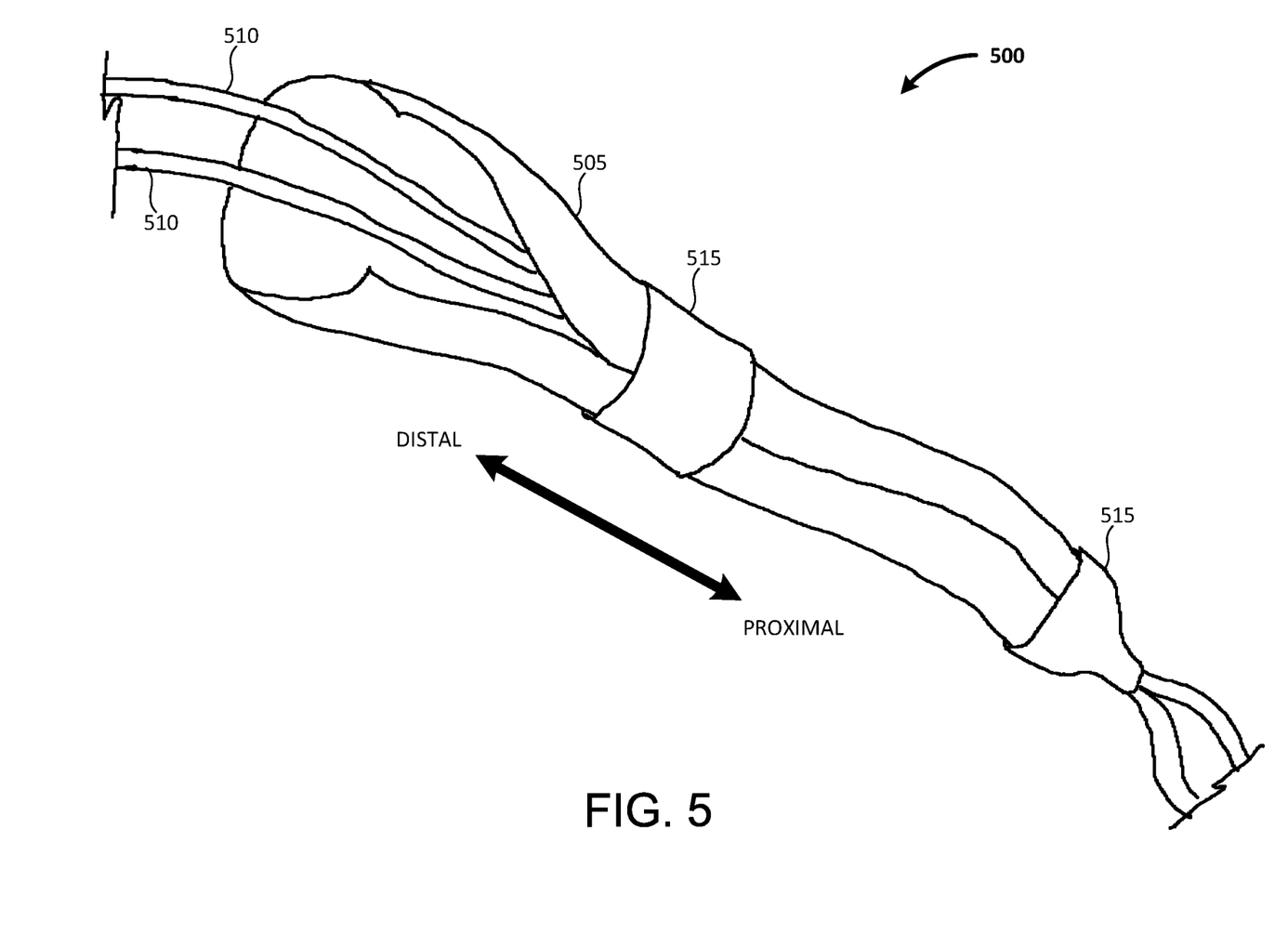
FIG. 5 depicts an exemplary shapeable conduit provided with exemplary axial resistance members.

FIG. 5 depicts an exemplary shapeable conduit provided with exemplary axial resistance members. In the depicted scenario 500, a shapeable conduit 505 is partially enclosing multiple cables 510. An axial resistance member 515 is disposed at a proximal end of the shapeable conduit 505. The axial resistance member 515 may, for example, be at least partially elastic. Accordingly, the axial resistance member 515, as depicted, may (releasably) couple to the shapeable conduit 505 and to the multiple cables 510. The axial resistance member 515 may, for example, resist axial motion (e.g., in a proximal and/or distal direction) of the shapeable conduit 505 relative to the cables 510. Accordingly, a user configuration of the cables 510 in the shapeable conduit 505 and/or of the shapeable conduit 505 in a (work) area (e.g., on a desk, behind a cabinet) may be advantageously maintained.

In the depicted example, a second axial resistance member 515 is disposed approximately midway along the shapeable conduit 505. The axial resistance member 515 is in an expanded configuration, such as, for example, after having been slid proximally along the shapeable conduit 505 such that a distal end of the shapeable conduit 505 may be operated into an open state. In some embodiments the axial resistance member 515 may, for example, be assembled over an end of the multiple cables 510, disposed around (e.g., wrapped, clasped) the axial resistance member 515 and/or multiple cables 510, or some combination thereof.

Figure 6:
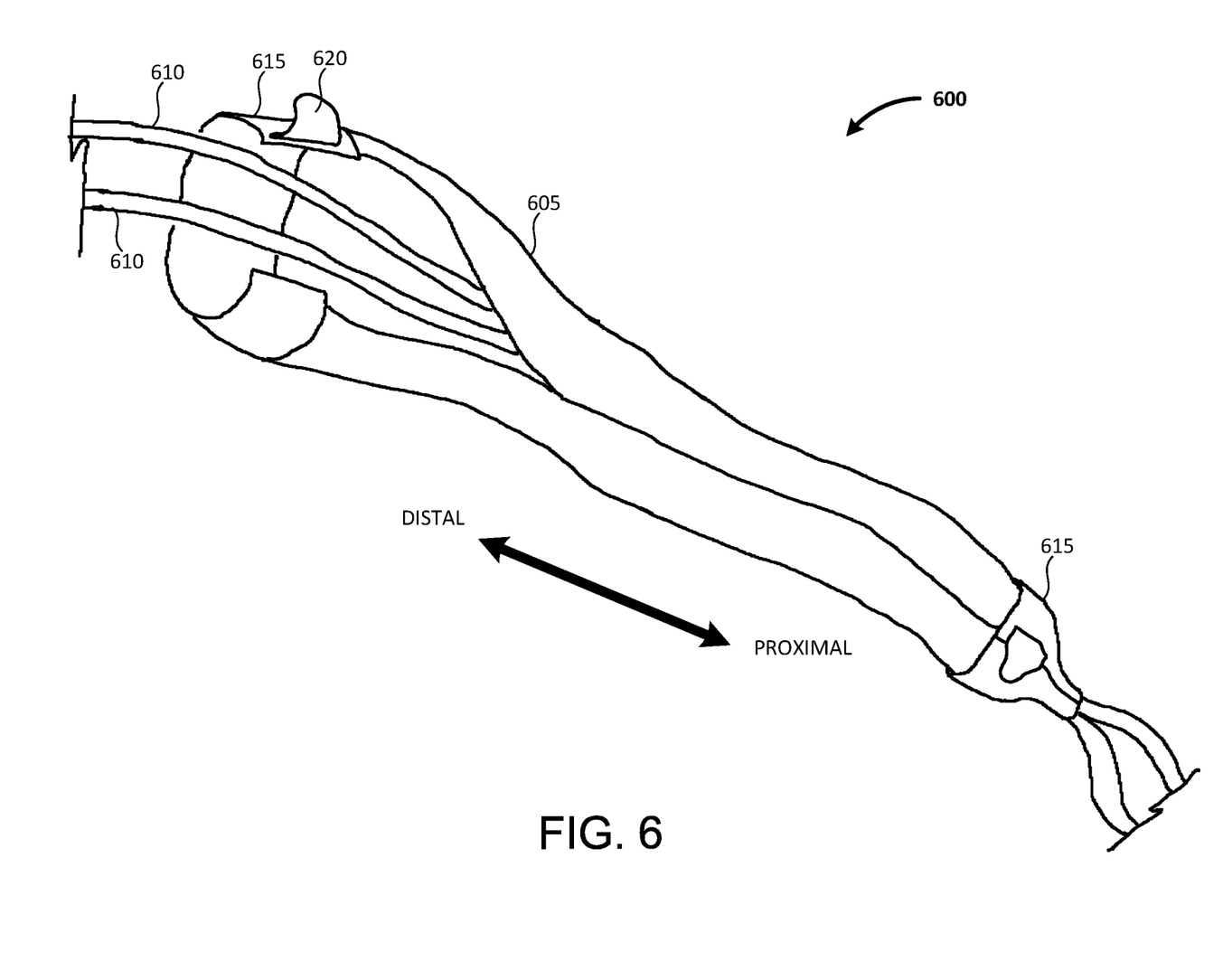
FIG. 6 depicts an exemplary shapeable conduit provided with exemplary circumferentially opening axial resistance members.

FIG. 6 depicts an exemplary shapeable conduit provided with exemplary circumferentially opening axial resistance members. In the depicted scenario 600, a shapeable conduit 605 partially encircles cables 610. An axial resistance member 615 is disposed at a proximal end of the shapeable conduit 605 and is depicted in a closed state. An axial resistance member 615 is disposed at a distal end of the shapeable conduit 605 and is depicted in an open state. Each axial resistance member 615 is provided with a tab 620. The tab 620 may, for example, advantageously permit a user to operate the corresponding axial resistance member 615 into an open and/or closed state. In various embodiments the axial resistance member 615 may, by way of example and not limitation, be comprised of (semi-)rigid plastic, metal (e.g., spring steel), or some combination thereof. Opposing ends of an axial resistance member 615 may, for example, overlap. Various embodiments may, for example, permit a user to advantageously (releasably) couple the shapeable conduit 605 to the cables 610 to prevent slippage of the shapeable conduit 605 along the cables 610.

Figure 7:
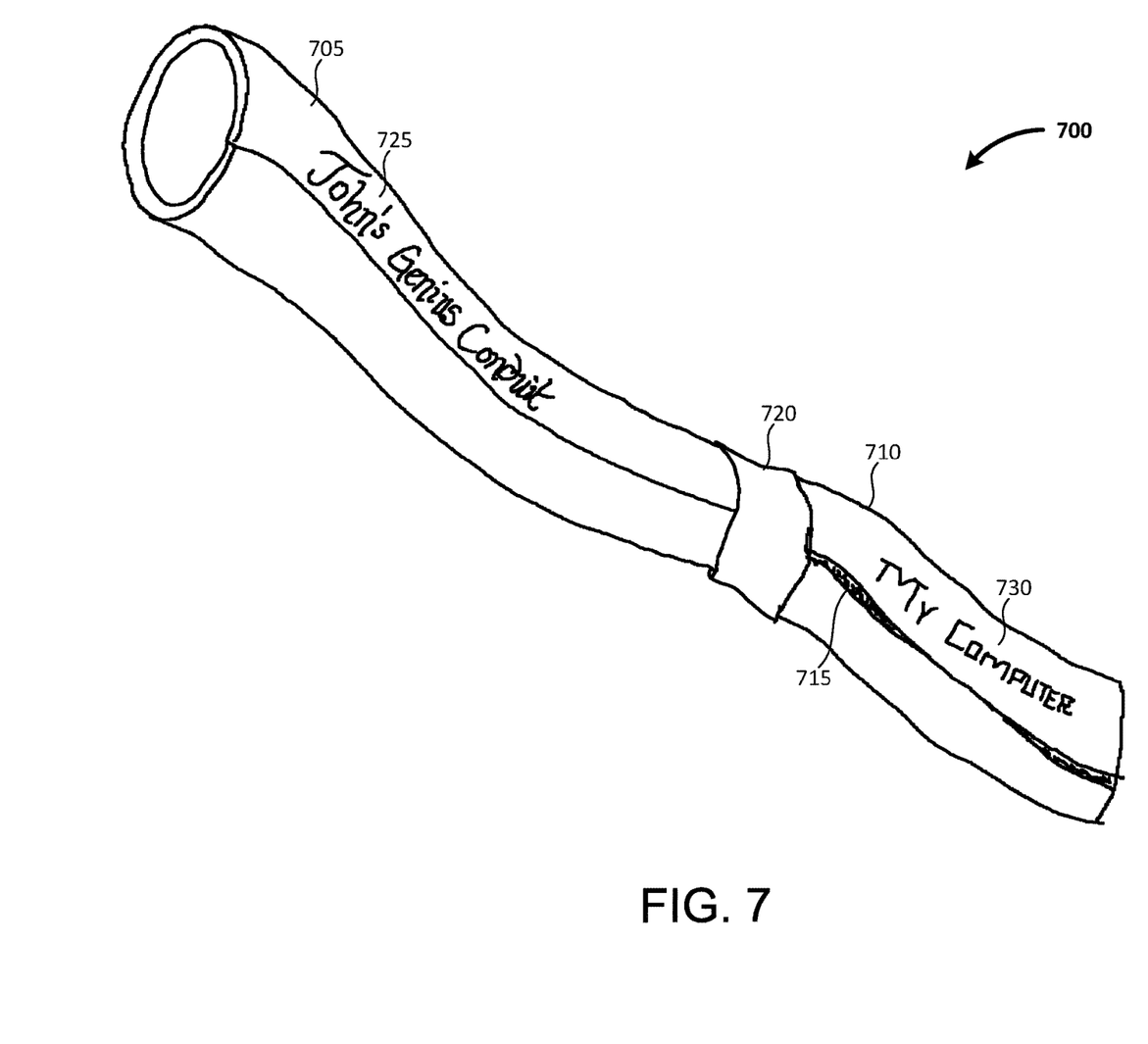
FIG. 7 depicts an exemplary shapeable conduit provided with an exemplary (decorative) jacket.

FIG. 7 depicts an exemplary shapeable conduit provided with an exemplary (decorative) jacket. In the depicted scenario 700, a shapeable conduit 705 is partially encircled by a jacket 710. The jacket 710 has a longitudinally extendable releasable coupling mechanism 715 (e.g., mating hook-and-loop surfaces, mating magnetic surfaces, overlapping surfaces). The jacket 710 is provided with an engagement end member 720. The engagement end member 720 may, for example, be elastic and/or separable from the jacket 710.

In the depicted example, the shapeable conduit 705 is decorated with visual indicia 725. The visual indicia 725 may, for example, be printed onto the shapeable conduit 705 (e.g., by a factory, by a personalization shop, by a user). A user may, for example, want to personalize the shapeable conduit 705. The user may, for example, personalize the jacket 710 with a custom visual indicia 730. The custom visual indicia 730 may, for example, be printed on the jacket 710 (e.g., in a predetermined printable area configured to accept pigment). The custom visual indicia 730 may, for example, be applied by a factory, a jacket 710 manufacturer, a customization shop, the user, or some combination thereof. The custom visual indicia 730 and/or the visual indicia 725 may, for example, be applied by a printer (e.g., inkjet, photopolymerization printer (e.g., UV printing), solvent printer, laser printer, 3D printer). For example, the jacket 710 may be advantageously decorated in a home printer in a flat configuration.

In various embodiments at least some predetermined region of a shapeable conduit and/or jacket therefor may, for example, be adapted to be customized. For example, the predetermined region may, for example, be chemically receptive to certain (e.g., predetermined) pigments (e.g., permanent marker, solvent inkjet ink). The predetermined may, for example, be constructed of a material configured to bond and/or react to certain (predetermined) materials (e.g., laser printer powder such as when applied by a laser printer, 3D printed polymer, heat and/or pressure-applied appliques, craft paint). Accordingly, a user may, for example, advantageously customize a shapeable conduit (e.g., directly and/or through a third-party).

Although various embodiments have been described with reference to the figures, other embodiments are possible. For example, although an exemplary system has been described with reference to the figures, other implementations may be deployed in other industrial, scientific, medical, commercial, and/or residential applications.

Various embodiments may be configured such that longer cables may be zig-zagged and/or otherwise configured (e.g., rolled, folded, spiraled) within the lumen. For example, longer cables may be advantageously retained within a shorter length lumen. Various embodiments may, for example, be provided with mechanisms (e.g., rolling core, spool, hooks) configured to receive cables.

In various embodiments apertures may be provided (e.g., user-created, factory-formed) in a wall of the shapeable conduit. For example, slits may be formed (e.g., scored, opened) in the wall. The slits may, for example, be made of overlapping material such that a resulting aperture is exposed upon separating the material, but otherwise the wall of the conduit maintains a relatively continuous configuration.

In various embodiments, a longitudinal releasable coupling mechanism may, by way of example and not limitation, include mating features on opposing longitudinal edges of a wall of a shapeable conduit when the wall is in an uncoupled state. In various embodiments the releasable coupling mechanism may, for example, be 'snapped' and/or otherwise manipulated into a closed state. The releasable coupling mechanism may, for example, be 'pulled apart' and/or otherwise manipulated into an open state. The coupling mechanism may, for example, be configured to require a predetermined level of hoop stress before transitioning between a coupled state and an uncoupled state.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A shapeable conduit comprising:
   a circumferentially flexible wall extendable along a longitudinal axis to define a lumen configured to receive one or more cables, the circumferentially flexible wall comprising:
   at least two longitudinally extendable manually deformable axial stiffening members coupled to the circumferentially flexible wall; and, a releasable coupling mechanism having at least two mating engagement members configured such that the at least two engagement members: (a) releasably engage in an enclosed state such that the wall circumscribes the lumen, and (b) are tangentially separable into an open state such that the one or more cables can be radially transferred between an interior and an exterior of the lumen,
   wherein the manually deformable axial stiffening members are configured such that, in response to manipulation of the circumferentially flexible wall by a user into a first axial configuration, the manually deformable axial stiffening members maintain the circumferentially flexible wall in the first axial configuration; and
   a cable coupling mechanism configured to releasably couple a first end of the circumferentially flexible wall to a flexible member disposed in the lumen and exiting the lumen at the first end.

2. The shapeable conduit of claim 1, wherein at least one of the manually deformable axial stiffening members is at least partially embedded in the circumferentially flexible wall.

3. The shapeable conduit of claim 2, wherein the at least one at least partially embedded manually deformable axial stiffening member is further at least partially encapsulated in the circumferentially flexible wall.

4. The shapeable conduit of claim 3, wherein the wall is constructed of at least one flexible material, and the at least one at least partially encapsulated manually deformable axial stiffening member is entirely embedded in the at least one flexible material.

5. The shapeable conduit of claim 1, wherein the at least two manually deformable axial stiffening members are arranged in a circumferential distribution around the wall.

6. The shapeable conduit of claim 1, wherein each manually deformable axial stiffening member comprises a plurality of manually deformable stiffening filaments.

7. The shapeable conduit of claim 1, wherein each manually deformable axial stiffening member is entirely circumferentially encapsulated by the circumferentially flexible wall.

8. The shapeable conduit of claim 1, wherein:
   a first engagement member of the at least two mating engagement members comprises a longitudinally extendable channel, and,
   a second engagement member of the at least two mating engagement members comprises a longitudinally extendable rib configured to be inserted into the channel.

9. A shapeable conduit comprising:
   a circumferentially flexible wall extendable along a longitudinal axis to define a lumen configured to receive one or more cables, the circumferentially flexible wall comprising:
   at least two longitudinally extendable manually deformable axial stiffening members; and,
   a releasable coupling mechanism having at least two mating engagement members configured such that the at least two engagement members: (a) releasably engage in an enclosed state such that the wall circumscribes the lumen, and (b) are tangentially separable into an open state such that the one or more cables can be radially transferred between an interior and an exterior of the lumen; and a cable coupling mechanism configured to releasably couple a first end of the circumferentially flexible wall to a flexible member disposed in the lumen and exiting the lumen at the first end.

10. The shapeable conduit of claim 9, wherein at least one of the manually deformable axial stiffening members is at least partially embedded in the circumferentially flexible wall.

11. The shapeable conduit of claim 10, wherein the at least one at least partially embedded manually deformable axial stiffening member is further at least partially encapsulated in the circumferentially flexible wall.

12. The shapeable conduit of claim 11, wherein the wall is constructed of at least one flexible material, and the at least one at least partially encapsulated manually deformable axial stiffening member is entirely embedded in the at least one flexible material.

13. The shapeable conduit of claim 9, wherein the at least two manually deformable axial stiffening members are arranged in a circumferential distribution around the wall.

14. The shapeable conduit of claim 9, wherein the manually deformable axial stiffening members are configured such that, in response to manipulation of the circumferentially flexible wall by a user into a first axial configuration, the manually deformable axial stiffening members maintain the circumferentially flexible wall in the first axial configuration.

15. The shapeable conduit of claim 9, wherein:
a first engagement member of the at least two mating engagement members comprises a longitudinally extendable channel, and,
a second engagement member of the at least two mating engagement members comprises a longitudinally extendable rib configured to be inserted into the channel.

16. The shapeable conduit of claim 15, wherein the channel is configured to expand during insertion of the rib and to contract upon full insertion of the rib such that the rib is releasably and elastically coupled within the channel.

17. The shapeable conduit of claim 15, wherein:
the channel comprises at least one cavity in a wall of the channel, and,
the longitudinally extendable rib comprises at least one protrusion configured to matingly engage the at least one cavity when the rib is inserted into the channel.

18. The shapeable conduit of claim 9, wherein the releasable coupling mechanism is configured to remain releasably coupled in the enclosed state until a tangential separating force above a predetermined threshold is applied to the releasable coupling mechanism.

19. The shapeable conduit of claim 10, wherein the circumferentially flexible wall comprises at least one region adapted to be customized.

\* \* \* \* \*